United States Patent [19]

Manos

[11] 3,839,294
[45] Oct. 1, 1974

[54] SULFONATION OF DIAMIDES OF META-PHENYLENEDIAMINE

[75] Inventor: Philip Manos, Wilmington, Del.

[73] Assignee: E. I. du Pont de Nemours and Company, Wilmington, Del.

[22] Filed: May 1, 1972

[21] Appl. No.: 249,208

[52] U.S. Cl.............................. 260/78 SC, 260/558 S
[51] Int. Cl............................................. C08g 20/38
[58] Field of Search..................... 260/78 SC, 558 S

[56] References Cited
UNITED STATES PATENTS

| | | | |
|---|---|---|---|
| 3,438,949 | 4/1969 | Crovatt, Jr. | 260/78 |
| 3,542,743 | 11/1970 | Flamand | 260/78 |
| 3,576,590 | 4/1971 | Hirsch | 8/115.5 |
| 3,654,237 | 4/1972 | Kosel et al. | 260/78 |
| 3,663,509 | 5/1972 | Bonnard et al. | 260/49 |
| 3,665,054 | 5/1972 | Burrows et al. | 260/857 |
| 3,719,641 | 3/1973 | Campbell et al. | 260/78 |

*Primary Examiner*—Lester L. Lee
*Attorney, Agent, or Firm*—Louis H. Rombach

[57] ABSTRACT

Process for sulfonating a diamide of a meta-phenylenediamine, for example, a film forming polyamide of meta-phenylenediamine and isophthaloyl chloride, with a sulfonating agent, for example, sulfur trioxide, which process comprises contacting the diamide and sulfonating agent in the presence of an N,N-dialkylacylamide, for example, N,N-dimethylformamide, until the desired sulfonation is completed.

8 Claims, No Drawings

SULFONATION OF DIAMIDES OF META-PHENYLENEDIAMINE

BACKGROUND OF THE INVENTION

1. Field of the Invention

This invention pertains to the sulfonation of diamides of meta-phenylenediamine.

2. Description of the Prior Art

Polyamides containing 2,4-diaminobenzenesulfonic acid units are useful in the textile fiber and selective permeation separation arts. U.S. Pat. No. 3,184,436 discloses copolymers which have increased affinity for basic dyes and which are prepared by condensing mixtures of meta-phenylenediamine and 2,4-diaminobenzenesulfonic acid with isophthaloyl chloride in hexamethylphosphoramide and in dimethylacetamide. U.S. Pat. No. 3,576,632 discloses the usefulness of hollow fiber permselective barrier membranes of such polymers which are prepared in a similar manner. The preparation of these polymers of high molecular weight and high sulfonic acid content by direct sulfonation of the polyamide is difficult, particularly since the rate of polymer degradation may exceed the rate of sulfonation. Moreover, such sulfonations generally must be carried out on polyamides which have been isolated from their preparation reaction mixtures.

Gilbert in "Sulfonation and Related Reactions," Interscience, New York, (1965), Kittila in "Dimethylformamide Chemical Uses," pages 213–216 Du Pont (1967) and U.S. Pat. No. 2,506,580 disclose that sulfur trioxide and compounds capable of liberating sulfur trioxide, such as chlorosulfonic acid, react with an amide, such as dimethylformamide, to form a complex which is stable and provides a useful and convenient source of sulfur trioxide for the sulfation of organic compounds. U.S. Pat. No. 2,807,642 discloses the removal of excess sulfur trioxide from reaction mixtures formed during the sulfonation of alkylbenzene detergent intermediates and other reactive organic compounds by means of formation and separation of complexes with a wide range of carboxamides and sulfonamides. Complexes of sulfur trioxide and dialkylacylamides have been used very little in the sulfonation of benzenoid compounds. Ratcliffe (Cornell University dissertation, 1954) reports that the complex of sulfur trioxide with dimethylformamide sulfonates toluene very slowly but it does not sulfonate benzene at room temperature.

SUMMARY OF THE INVENTION

It is an object of this invention to provide a process for directly sulfonating a diamide of a meta-phenylenediamine. A further object is to provide such a process which can be carried out on polyamides without appreciable degradation thereof. In summary, the present invention resides in a process which comprises contacting a diamide of a 4(or 6-)-unsubstituted 1,3-diaminobenzene with a sulfonating agent, such as sulfur trioxide, and a dialkylacylamide, such as N,N-dimethylformamide, to produce a 4(or 6-)-monosulfonated derivative thereof. In a preferred aspect, this invention resides in a process for sulfonating a dicarboxamide of metaphenylenediamine, which dicarboxamide can be polymeric, by contacting it with at least one molecular proportion of sulfur trioxide and of dimethylformamide or dimethylacetamide for each gram formula weight of meta-phenylenediamine moieties in the dicarboxamide at 25°–90°C. for 15 minutes to 72 hours.

DETAILED DESCRIPTION OF THE INVENTION

The material to be sulfonated, sulfonating agent, and dialkylacylamide can be contacted in the processes of this invention in any convenient way. For instance, the material to be sulfonated can be added to a solution of the sulfonating agent in an excess of the dialkylacylamide. Alternatively, the sulfonating agent can be added to a solution of the material to be sulfonated in the dialkylacylamide. Generally, it is better to avoid adding the dialkylacylamide to a mixture of the material to be sulfonated and the sulfonating agent in order to avoid any premature reaction, such as degradation of the material to be sulfonated. Sulfonation is carried out by maintaining the material to be sulfonated, the sulfonating agent and the dialkylacylamide in mutual contact for a combination of temperature and time which effects significant sulfonation, which combination can easily be determined by routine experimentation from a consideration of the reactivities of the material to be sulfonated and the sulfonating agent. For example, poly(meta-phenylenediamine isophthalamide), a useful starting material in the process of this invention, is sulfonated smoothly and without any appreciable evolution of heat by sulfur trioxide in dimethylformamide in 24 to 48 hours at about 25°C.; sulfonation is essentially complete after a few hours at a temperature of 40°–80°C. and in less than one hour at temperatures above about 80°C. Temperatures as high as 120°–140°C. may be required for substantial sulfonation in a few hours with less reactive sulfonating agents, such as chlorosulfonic acid and sulfuric acid. The reaction can be carried out at atmospheric pressure at temperatures up to the atmospheric pressure boiling point of the dialkylacylamide. A temperature of 25°–90°C. is preferred since such temperatures are more conveniently obtained and controlled in inexpensive chemical process equipment. Contact times between about 15 minutes and about 3 days are preferred.

The proportions of reactants present in the sulfonation reaction mixtures described herein are not critical. Sulfonation is conveniently obtained with mixtures containing 5–20 weight percent of the material to be sulfonated, the maximum concentration with polymeric materials being limited by the inconvenience of handling viscous solutions. Significant sulfonation can be obtained with mixtures containing as little as 1 weight percent of the sulfonating agent. Preferably, the mixture contains at least one molecular proportion of sulfonating agent for each gram formula weight of meta-phenylenediamine in the material being sulfonated. The reaction mixture preferably contains at least one molecular proportion of dialkylacylamide for each molecular portion of sulfonating agent. There is little advantage in using quantities of the sulfonating agent significantly greater than stoichiometric since sulfonation continues only until one sulfonic acid group is introduced into each reactive meta-phenylenediamine moiety. Additional dialkylacylamide can be present in the reaction mixture as a solvent and diluent for the other ingredients of the mixture.

The sulfonation reaction can be followed by techniques well known in the art. For example, the sulfonated product can be isolated and shown to contain sulfur by chemical analysis or by studies of infrared spectra. With those materials which form water soluble sulfonation products from insoluble starting materials, the progress of the sulfonation reaction can be followed by diluting small aliquots of the reaction mixture with water. Increased sulfonation is indicated by the precipitation of smaller amounts of the starting material until the product becomes completely water soluble. With polymeric materials which are useful as permselective membranes, sulfonation is indicated by the greater water permeability of membranes made from sulfonated polymers as compared to similar membranes made from unsulfonated polymers. With polymers such as the poly(meta-phenylenediamine phthalamides), and their lithium and calcium salts, having inherent viscosities of about 1–2, the progress of the sulfonation reaction can be followed by pouring a portion of the sulfonation reaction mixture (optionally neutralized with lithium or calcium hydroxide) into rapidly stirred acetone, separating the precipitated polymer by filtration, rinsing with water on the filter to remove acidic materials, drying, redissolving the polymer in dimethylacetamide, and diluting the polymer solution with water. Unsulfonated polymers are precipitated in the acetone and are recovered essentially unchanged in properties upon dilution of their dimethylacetamide solutions with water. Significantly sulfonated polymers (containing more than about 1 percent sulfur) swell upon rinsing with water after their precipitation with acetone, with a decrease in the rate of water passage through the polymer during such rinsing. Such polymers containing about 2.5–4 percent sulfur form viscous colloidal dispersions upon dilution of their dimethylacetamide solutions with water. Sulfonated polymers containing more than about 4 percent sulfur form clear, viscous, gelatinous masses upon dilution of such solutions with water.

The sulfonated product can be isolated from the reaction mixture by conventional procedures which can be modified by those skilled in the art. Certain reaction products can be precipitated by pouring the reaction mixture into a liquid in which the product is insoluble. Since many of the sulfonated products are more soluble in the acid form, it is usually preferable to neutralize the sulfonation mixture with a base, such as calcium or lithium hydroxide, and then to precipitate the salt, for example, in acetone or another similar liquid in which the salt is insoluble. The precipitated salt can be washed free of other materials with alcohol or a solvent for the other materials. Such salts frequently show higher inherent viscosities (measured at low concentrations in dimethylacetamide) than the unsulfonated polymers.

A wide variety of sulfonating agents are operable in the process of the present invention. Sulfur trioxide is the preferred sulfonating agent because of its low cost and ready availability and because of the lower temperatures at which it is reactive. It can be used in the form of oleum (that is, fuming sulfuric acid or solutions of sulfur trioxide in sulfuric acid). Operable sulfonating agents include those which yield sulfur trioxide in reaction mixtures containing organic amides in which the hydrogen atoms attached to the amide nitrogen have been replaced by hydrocarbon radicals or substituted hydrocarbon radicals, for example, as disclosed in U.S. Pat. No. 2,506,580. Useful sulfonating agents include compounds of the general formula $ROSO_2X$ in which R is hydrogen or $C_{1-4}$ alkyl and X is hydroxy, amino, $C_{1-4}$ alkoxy or chloro. Included among the above are chlorosulfonic acid and its methyl ester, methylsulfuric acid, dimethyl sulfate, diethyl sulfate, sulfamic acid, sulfuric acid and mixtures of sulfuric acid and dehydrating agents, such as acetic anhydride.

The dialkylacylamide employed in the process of the invention can be represented by the formula

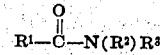

wherein $R^1$ is H or $C_{1-4}$ alkyl, $R^2$ and $R^3$ are the same or different and are $C_{1-4}$ alkyl, $R^2$ and $R^3$ conjointly is $C_{4-5}$ alkylene or oxalkylene or azalkylene containing 3–4 carbon atoms and one oxygen or nitrogen atom, and $R^1$ and either $R^2$ or $R^3$ conjointly is $C_{3-4}$ alkylene which with the

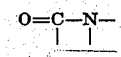

portion of the formula is a pyrrolidone or piperidone moiety. Preferably, the total number of carbon atoms in $R^1$, $R^2$ and $R^3$ is no greater than seven because of the more convenient and less expensive preparation of such dialkylacylamides. The preferred materials, because of their commercial availability, are N,N-dimethylformamide and N,N-dimethylacetamide, but also useful are such materials as N-methyl-N-butylformamide, N-methyl-N-ethylpropionamide and N,N-diethylacetamide. When $R^2$ and $R^3$ conjointly is $C_{4-5}$ alkylene, it forms with the nitrogen atom of the formula a pyrrolidine or piperidine moiety. N-Acetylpiperidine exemplifies such a dialkylacylamide when $R^1$ is $CH_3$. When $R^2$ and $R^3$ conjointly is 3-oxa-1,5-pentylene or 3-aza-1,5-pentylene, it forms with the nitrogen atom of the formula a morpholine or piperazine moiety. N-Formylmorpholine and N-formylpiperazine exemplify such dialkylacylamides when $R^1$ is H. N-Methylpyrrolidone exemplifies a dialkylacylamide when $R^3$ is $CH_3$ and $R^1$ and $R^2$ conjointly is the 1,3-propylene diradical. All the dialkylacylamides discussed above are solvents for the sulfonating agent and the diamide being sulfonated in the process of the invention.

Complexes between sulfur trioxide and dialkylacylamides are well known. The sulfur trioxide-dimethylformamide complex forms readily upon addition of liquid or gaseous sulfur trioxide to an excess of dimethylformamide with cooling to 0°–10°C. It is soluble in dimethylformamide to the extent of about 15 weight percent and, at such concentration, is conveniently stored and/or used. The complex can be formed in other ways, such as by the addition of a solution of sulfur trioxide in an inert diluent, for example, chloroform, to dimethylformamide. Similar complexes are formed between sulfur trioxide and other N,N-dialkylacylamides, sometimes with the evolution of large amounts of heat. For example in order to control the reaction when dimethylacetamide is employed, liquid sulfur trioxide is added to an equal weight of a mixture of dimethylacetamide and chloroform at 0°–10°C. or, alternatively if higher temperatures are used, a solution of sulfur trioxide in chloroform is added to an excess of dimethylacetamide, or gaseous sulfur trioxide is bubbled slowly into dimethylacetamide. It is to be understood, however, that the present invention does not require the formation of such complexes in the reaction mixture.

Materials which can be sulfonated by the process of this invention are diamides, that is, diacylamides, of meta-phenylenediamine. The diamide can be a dicarboxamide, a disulfonamide or a mixed carboxamide-sulfonamide and, as such, contains the —NH—CO— and/or —NH—SO$_2$— moiety. The dicarboxamides are preferred herein. In order for monosulfonation to occur, at least one of the two phenylene ring positions which are ortho to one amino group and para to the other must be free of a substituent. Even though both such positions are free of substituents, only one becomes sulfonated during the reaction. Considering meta-phenylenediamine as 1,3-diaminobenzene, at least one of the 4- and 6- positions must be unsubstituted. The 2-, 5- and remaining 4- or 6- position can be substituted with an inert substituent, that is, one which does not enter into, affect or prevent sulfonation of the ring at the 4- or 6- position. For example, the substituents which are inert include alkyl, preferably $C_{1-4}$ alkyl, and halo, preferably chloro. The preferred diamides of meta-phenylenediamine are unsubstituted.

It has been discovered that the starting material must be a diamide of meta-phenylenediamine for sulfonation to occur according to the process of this invention. For example, although the bis-benzamide of meta-phenylenediamine is sulfonated by this process, the bis-benzamide of para-phenylenediamine is not, nor is the mono-benzamide of aniline (benzanilide).

As derivatives of carboxylic acids the preferred useful diamides are derivatives of mono- or dicarboxylic acids containing 1–18 or 2–18 carbon atoms, respectively, or benzenoid carboxylic acids containing 7–10 carbon atoms. The preferred derivatives of monocarboxylic acids are monocarboxylic acids containing 1–4 carbon atoms. Included are derivatives of acetic, oxalic, benzoic and the phthalic acids. As derivatives of sulfonic acids, the diamides preferably are derivatives of benzenoid sulfonic acids containing 6–9 carbon atoms, for example, benzene- or toluenesulfonic acid.

The useful diamides of meta-phenylenediamine can be derivatives of carbonic acid and thus are known as carbamates or urethanes and contain the —NHCO$_2$— moiety. Similarly, the diamides can contain the urea moiety —NHCONH— or the semicarbazide moiety —NHCONHNH—. Such urethanes, ureas and semicarbazides can be derivatives of $C_{2-18}$ alkyl or $C_{6-18}$ aryl alcohols, amines or hydrazines.

If the diamides are derivatives of dicarboxylic acids, they can be polymeric in nature. Such materials include aromatic polyamides, poly(amide-hydrazides), polyureas, polyurethanes and polysemicarbazides. Because of their commerical utility, the preferred materials are polyamides of meta-phenylendiamine and phthalic acids with molecular weights high enough to be film-forming and fiber-forming but low enough to be soluble in practical solvents so that films and fibers can be formed from their solutions. Such polymers have inherent viscosities above about 0.6 (measured at a concentration of 0.5 weight percent) and are soluble to the extent of at least about 10 weight percent at 25°C. in a medium consisting of 0–3 weight percent lithium chloride in a solvent selected from the group consisting of dimethylacetamide, dimethyl sulfoxide, N-methylpyrrolidone, hexamethylphosphoramide, and mixtures thereof.

Aromatic polyamides which can be sulfonated by the process of this invention are well known. They can be prepared, for example, by the low temperature solution condensation of one or more aromatic diamines with one or more dibasic acid chlorides. Such processes are described in U.S. Pat. Nos. 3,094,511; 3,232,910; and 3,240,760, and British Patent 1,104,411 and by Morgan in Polymer Reviews, Volume 10, Condensation Polymers, Interscience Publishers, New York (1965). They also can be prepared by reaction of one or more aromatic aminoacid chlorides with one or more meta-phenylenediamines, followed by reaction of the resulting intermediate diamide with one or more dibasic acid chlorides.

Aromatic (polyamide-hydrazides) containing meta-phenylenediamine moieties which can be sulfonated as described herein can be prepared by the condensation of one or more aromatic aminocarboxylic hydrazides with one or more dibasic acid chlorides. Such processes include that described by Culbertson and Murphy in Polymer Letters, Volume 5, pages 807–812 (1967). Aromatic poly(diamide-dihydrazides) can be prepared by reaction of one or more nitroaromatic acid chlorides with one or more dicarboxylic dihydrazides, reducing the resulting aromatic dinitrodihydrazide to an aromatic diaminodihydrazide, and condensing the aromatic diaminodihydrazide with one or more dibasic acid chlorides to give the aromatic poly(diamide-dihydrazide). Such processes include that described by Frost et al. in the Journal of Polymer Science, Volume A-1, pages 215–233 (1968).

Aromatic polysemicarbazides can be prepared by the reaction of one or more dicarboxylic dihydrazides with one or more aromatic diisocyanates. Such processes include that described in U.S. Pat. No. 3,004,945 and by Campbell et al. in the Journal of Applied Polymer Science, Volume 2, pages 155–162 (1959). Aromatic polyureas can be prepared by the reaction of one or more diamines with one or more aromatic diisocyanates. Such processes include that described in U.S. Pat. No. 2,888,438.

In carrying out the process of this invention the reaction mixture can contain materials other than the diamide, sulfonating agent and dialkylacylamide, provided that the material is inert under the reaction conditions. Such materials can be organic or inorganic. For example, they can be diluents or solvents such as aromatic and chlorinated hydrocarbons or they can be inorganic salts. Such diluents and salts can be already present in the diamide starting material or they can be added as desirable ingredients to the sulfonation reaction mixture. Salts which can be added and which are useful for increasing the solubilities of aromatic polyamides in dimethylformamide, dimethylacetamide and N-methyl-2-pyrrolidone, and especially aromatic polyamides which are used in the preparation of permselective membranes, include calcium chloride, calcium bromide, magnesium chloride, strontium chloride, lithium chloride, lithium bromide, lithium nitrate, sodium bromide and ammonium bromide. The advantages of such salts are disclosed in U.S. Pats. Nos. 3,068,188 and 3,567,632.

Useful diluents include solvents such as disclosed in U.S. Pat. No. 3,063,966 for the condensation of aromatic diamines with aromatic diacid dihalides, which solvents have an average solute-solvent interaction energy with complementary model compounds representative of the polymers obtained greater than about 1,100 calories per mole. The hydrogen chloride formed in such condensation reactions can also be present in the sulfonation reaction mixture as in inert ingredient. Useful inert solvents include cyclic methylene sulfones, acetonitrile, dimethylcyanamide and halogenated non-aromatic hydrocarbons containing at least one hydrogen atom attached to a carbon atom which is attached to a halogen atom, for example, methylene chloride.

This invention provides a relatively simple and inexpensive process for the production of diamides of 2,4-diaminobenzenesulfonic acid. It also provides a simple and inexpensive process for the sulfonation of polyamides containing the meta-phenylenediamine moiety to obtain randomly substituted polymers with high inherent viscosities and high degrees of sulfonation without significant polymer degradation. The process is particularly practical in that it can be carried out on polyamides without isolation of the polyamides from the solutions in which they are obtained by condensation reactions.

The sulfonation process of this invention makes possible the production of formed and shaped structures of sulfonated aromatic polyamides from meta-phenylenediamine and phthaloyl chlorides without intermediate isolation of the sulfonic acid-containing polymer. For example, meta-phenylenediamine optionally containing other diamines can be condensed with one or more phthaloyl chlorides in solution in a dialkylacylamide to obtain a solution of a poly(meta-phenylenediamine phthalamide) containing hydrogen chloride, and then sulfur trioxide or a material forming sulfur trioxide can be added to the polymer solution. The mixture is heated, if necessary or desirable, to obtain sulfonation or to increase the rate of sulfonation, and a base such as calcium or lithium hydroxide is added to neutralize the acidic materials in the mixture (the inorganic salts which precipitate can be separated). A shaped structure can be formed from the resulting solution and non-polymeric components can be removed from the structure by extraction with a suitable solvent. Such a procedure is particularly desirable in producing such formed and shaped structures as fibers which are useful in textile applications and in producing films and hollow fibers which are useful in permselective membrane applications.

Additional embodiments of the invention are provided in the following examples. In the examples, parts and percentages are by weight unless otherwise indicated.

Example 1

Liquid sulfur trioxide (commercially available under the name "Sulfan") was added dropwise with stirring and cooling to dry dimethylformamide at such a rate that the temperature did not exceed 10°C. The resulting solution containing about 6 weight percent sulfur trioxide was diluted with dimethylformamide to a sulfur trioxide content of about 3 percent. Into a glass jar were placed 5 grams of the bis-benzamide of meta-phenylenediamine (melting point 240°-243°C., obtained by reaction of meta-phenylenediamine and benzoyl chloride) and 45 grams of the 3 percent solution of sulfur trioxide in dimethylformamide. The jar was tumbled slowly at ambient temperature for three days. The reaction mixture was completely miscible with water, indicating substantially complete sulfonation. Water dilution of a similar mixture immediately after mixing resulted in precipitation of the bis-benzamide.

Example 2

A mixture of 5 grams of the bis(benzenesulfonamide) of meta-phenylenediamine (melting point 192°-195°C.) and 45 grams of a 5 percent solution of sulfur trioxide in dimethylformamide was maintained at 78°C. for 6 hours. The reaction product was completely soluble when the mixture was diluted with water, indicating substantially complete sulfonation. The starting material was recovered substantially unchanged by water dilution of a similar mixture kept at ambient temperature for three days.

Example 3

In 493 grams of a 10.7 percent solution of sulfur trioxide in dimethylformamide were dissolved 40 grams of a polymer obtained by the condensation of meta-phenylenediamine with a 70/30 mixture of isophthaloyl chloride and terephthaloyl chloride. The resulting solution was placed in a glass jar and the jar was slowly tumbled at ambient temperature for three days. To this mixture was added a slurry of 25.6 grams of lithium hydroxide in 25 ml. of water. The resulting mixture was poured into rapidly stirred acetone. The precipitated polymer was rinsed several times with acetone and then with 95 percent ethyl alcohol. After drying, the resulting polymer contained 10.7 percent total sulfur and less than 0.2 percent inorganic sulfur, indicating the presence of approximately one sulfonic acid group for each two aromatic rings in the polymer chain. A portion of the sulfonated polymer was refluxed in 10 percent aqueous sodium hydroxide for three hours to hydrolyze the polyamide and obtain a mixture of water soluble sodium salts. The resulting solution was cooled and acidified with aqueous hydrochloric acid to precipitate a mixture of isophthalic and terephthalic acids. The precipitated mixture of acids was separated by filtration. The filtrate was neutralized with sodium carbonate and evaporated to dryness. The residual sodium salts were extracted with a solution of calcium chloride in dimethylacetamide to convert sulfonic acids present to soluble calcium salts. The resulting solution was diluted with benzene and the oil which formed was separated. This oil was dissolved in water and converted into a dihydrochloride salt by adding concentrated aqueous hydrochloric acid. The infrared spectrum of the isolated dihydrochloride salt was essentially identical in all significant details to that of an authentic sample of the dihydrochloride salt of 2,4-diaminobenzenesulfonic acid and contained no evidence of significant amounts of a sulfophthalic acid, thereby demonstrating that the sulfonated polymer was essentially a polyphthalamide of 2,4-diaminobenzenesulfonic acid.

Example 4

In 85 grams of a 3 percent solution of sulfur trioxide in dimethylformamide were dissolved approximately 15 grams of the condensation polymer employed in the sulfonation step of Example 3. The resulting solution was place in a glass jar and the jar was slowly tumbled at ambient temperature for three days. To the mixture was added 1.8 grams of lithium hydroxide, sufficient to neutralize unreacted sulfur trioxide and to convert the sulfonated product to its lithium salt. The mixture was slowly tumbled for an additional two hours and then poured into rapidly stirred acetone. The precipitated polymer was rinsed several times with acetone and then with 95 percent ethyl alcohol. After drying, the polymer contained 4.8 percent total sulfur, an amount corresponding approximately to one sulfonic acid group for each four aromatic rings in the polymer chain.

A prior art procedure, for example, as disclosed in U.S. Pat. No. 3,567,632, was used to prepare asymmetric permselective membranes with both the unsulfonated polyamide and the sulfonated polyamide. After a two-week exposure in reverse osmosis test cells to 0.5 percent aqueous sodium chloride at 600 psi. under conditions such that approximately 10 percent of the solution fed to the test cell passed through the membrane, the membrane made with the unsulfonated polymer had a water permeability of 6.3 gallons per sq. ft. per day and a salt passage of 3.1 percent and the membrane made with the sulfonated polymer had a water permeability of 35.1 gallons per sq. ft. per day and a salt passage of 15.5 percent.

Example 5

Into a glass jar were introduced 7.5 grams of the condensation polymer employed in the sulfonation step of Example 3 and 40.2 grams of a 6.2 percent solution of sulfur trioxide in dimethylformamide. The jar was slowly tumbled for three days at ambient temperature. To the reaction mixture were added 1.1 grams of lithium hydroxide and the jar was tumbled for an additional one day. To the neutralized solution were added 2.25 grams of lithium nitrate and the resulting mixture was filtered to remove insoluble material (mostly lithium sulfate). Without isolation of the polymer, a prior art procedure, for example, as disclosed in U.S. Pat. No. 3,567,632, was used to prepare an asymmetric membrane which had a water permeability of 19.9 gallons per sq. ft. per day and a salt passage of 25 percent under the test conditions described in Example 4.

Example 6

To 50 grams of a 7.5 percent solution of sulfur trioxide in dimethylformamide were added 5 grams of the condensation polymer employed in the sulfonation step of Example 3. The mixture was heated with stirring to 80°C. and held at this temperature for 15 minutes. The mixture was then cooled to ambient temperature and poured into rapidly stirred acetone. The precipitated polymer was separated by suction filtration, rinsed extensively with acetone, and dried. A portion of the dried polymer was dissolved in a relatively small volume of dimethylacetamide and the solution was diluted with water, forming a clear gelatinous mass characteristic of similar mixtures containing highly sulfonated poly(meta-phenylenediamine phthalamides).

Example 7

Approximately 5 grams of liquid sulfur trioxide were heated at 40°–50°C. while the vapors therefrom were directed into a receiver containing 100 grams of dry dimethylacetamide maintained at 0°–10°C. To the resulting clear solution of sulfur trioxide in dimethylacetamide were added 5 grams of the condensation polymer employed in the sulfonation step of Example 3. The resulting solution was rotated slowly in a jar at ambient temperature for three days. The reaction mixture was neutralized with 3 grams of lithium hydroxide and the polymer was precipitated by pouring into rapidly stirred acetone. The precipitated product was collected by filtration, rinsed several times with acetone and then with 95 percent ethyl alcohol and dried. Infrared evaluation of the dried polymer showed the presence of appreciable amounts of sulfonated material. The isolated polymer swelled extensively in mixtures of acetone and water in a way which is characteristic of sulfonated poly(meta-phenylenediamine phthalamides) containing in excess of about 1 percent total sulfur.

Example 8

Into a jar were introduced 10 grams of the condensation polymer employed in the sulfonation step of Example 3 and a solution of 12 grams of chlorosulfonic acid in 108 grams of dry dimethylformamide. The jar was slowly tumbled at ambient temperature for 3 days. The reaction mixture was then poured into rapidly stirred acetone and the precipitated polymer was washed thoroughly and dried. The sulfonated polymer contained 1.5 percent total sulfur.

Example 9

Example 8 was repeated except that dimethylacetamide was used in place of dimethylformamide. The sulfonated polymer contained 2.1 percent total sulfur.

Example 10

Example 9 was repeated except that the reaction was carried out in a small round flask fitted with a drying tube and the flask was placed in a bath maintained at 45°C. Agitation was effected by stirring rather than by tumbling. The sulfonated polymer contained 6.8 percent total sulfur.

Example 11

To a solution of 7 grams of dimethyl sulfate in 50 grams of dimethylformamide were added 5 grams of the condensation polymer employed in the sulfonation step of Example 3. The resulting solution was heated with stirring at 120°–130°C. for two hours and then cooled to ambient temperature. The mixture was poured into rapidly stirred water. The precipitated polymer was collected by filtration, rinsed several times with water, and dried at 100°C. A clear gelatinous mass, characteristic of extensively sulfonated poly(meta-phenylenediamine phthalamides), was obtained upon dissolving a portion of the product in dimethylacetamide and diluting same with water. No detectable sulfonation was obtained in three days at ambient temperature with a similar reaction mixture.

Example 12

To a cooled mixture of 750 parts of chloroform and 750 parts of dimethylacetamide were added 250 parts of liquid sulfur trioxide. The mixture was diluted with about 3,500 parts of dimethylacetamide to obtain a solution containing approximately 5 percent sulfur trioxide. Into a glass jar were introduced 15 grams of the condensation polymer employed in the sulfonation step of Example 3 and 185 grams of the 5 percent sulfur trioxide solution. The jar was slowly tumbled at ambient temperature for 3 days. To the reaction mixture were then added 5.5 grams of lithium hydroxide and the sulfonated polymer was isolated as described in Example 3. The dried polymer contained 9.1 percent total sulfur.

Example 13

To a solution of 7 grams of 96–98 percent sulfuric acid in 50 grams of dimethylformamide were added 5 grams of the condensation polymer employed in the sulfonation step of Example 3. The resulting solution was heated at 140°–150°C. for two hours with stirring and then cooled to ambient temperature and poured into rapidly stirred ice cold water. The precipitated polymer was collected by suction filtration and rinsed extensively with cold water. The rate of filtration slowed with continued rinsing, indicating swelling of the polymer, a characteristic of sulfonated poly(meta-phenylenediamine phthalamides) in weakly acidic aqueous systems. The isolated polymer was dried at 100°C. A portion of the dried polymer was dissolved in dimethylacetamide to produce a 15 percent solution. The resulting solution was coated onto a glass plate and the plate was heated by means of a hot plate for a few minutes at 100°C. and then immersed in water. The film so obtained had properties, including tensile properties, characteristic of films of sulfonated poly(meta-phenylenediamine phthalamides) which are prepared by the procedure of Example 1. When the experiment was repeated except that heating was carried out at 120°–130°C., the starting polymer was recovered without significant change by pouring the cooled mixture into rapidly stirred ice cold water and rinsing to remove acidic materials. When the experiment was carried out at 140°C. without the dimethylformamide, signifcant polymer degradation occurred; upon reducing the reaction temperature to 120°C., the starting polymer was recovered without significant change.

Example 14

To 60 grams of ice cold dimethylformamide were added, in small portions and with stirring, 7 grams of fuming sulfuric acid containing about 20 percent free sulfur trioxide. To the resulting solution were added 5 grams of the condensation polymer employed in the sulfonation step of Example 3. The mixture then was tumbled slowly at ambient temperature for two days in a tightly closed jar. The reaction mixture was poured into stirred ice cold water and the precipitated polymer was collected by suction filtration, rinsed with water to remove residual acid, and dried. Upon dissolving a small amount of the polymer in dimethylacetamide and diluting same with water, a clear gelatinous mass, characteristic of highly sulfonated polyamides, was produced. A film prepared as described in Example 13 indicated that the polymer had undergone no significant reduction in tensile properties.

Example 15

To an ice cold solution of 5 grams of 96–98 percent sulfuric acid in 60 grams of dimethylformamide were added 5.5 grams of acetic anhydride. To this solution were added 5 grams of the condensation polymer employed in the sulfonation step of Example 3 and the mixture was tumbled slowly for 16 hours at ambient temperature in a tightly closed jar. The polymer was isolated by pouring into rapidly stirred water, separating the precipitated polymer by filtration, rinsing with water, and drying. Upon dissolving a portion of this polymer in a small volume of dimethylacetamide and diluting same with water, a clear gelatinous mass, indicative of extensive sulfonation, was obtained. A film of this sulfonated polymer prepared as described in Example 13 showed that the polymer had undergone no significant loss in tensile properties.

Example 16

The experiment described in Example 15 was repeated employing dimethylacetamide in place of dimethylformamide. After stirring the reaction mixture for 16 hours at ambient temperature, a small amount of the mixture was treated to recover polymer. When the isolated polymer was dissolved in dimethylacetamide and diluted with water, it precipitated, an indication that it was unsulfonated. The remaining portion of the reaction mixture was then heated with stirring at 80°C. for 45 minutes and the polymer was isolated therefrom. Upon dissolving a portion of the polymer in dimethylacetamide and subsequently diluting same with water, a clear gelatinous mass, characteristic of highly sulfonated poly(meta-phenylenediamine phthalamides), was produced. A film prepared as described in Example 13 indicated that the polymer had undergone no apparent degradation or reduction in tensile properties.

Example 17

To a solution of 10 grams of sulfamic acid in 90 grams of dry dimethylformamide were added 10 grams of the condensation polymer employed in the sulfonation step of Example 3 and the mixture was tumbled for 3 days at ambient temperature in a tightly sealed jar. Preliminary tests, including precipitation of a portion of the reaction mixture by pouring into water and dissolution of the polymer in mixtures of dimethylacetamide and water, indicated that no significant sulfonation had occurred. The reaction mixture was then heated to 70°–80°C. for 4 hours. The polymer was isolated by precipitation in water, filtration, and rinsing with acetone. During the rinsing there was a reduction in the rate of filtration, characteristic of the polymer swelling obtained with sulfonated poly(meta-phenylenediamine phthalamides). A small amount of the dry polymer was dissolved in dimethylacetamide. Addition of water to the resulting solution produced a viscous transparent gelatinous mass, indicative of extensive sulfonation.

Example 18

A polymer with an inherent viscosity of 0.53 (measured at a concentration of 0.5 weight percent in dimethylacetamide) was prepared by condensing 2,4-diaminoisopropylbenzene and a 70/30 mixture of isophthaloyl chloride and terephthaloyl chloride. To 16 grams of this polymer were added 200 ml. of dimethylformamide containing 10 percent sulfur trioxide. The mixture was heated with stirring at 100°C. for 1.5 hours and then cooled to 25°C. Anhydrous lithium hydroxide (12 grams) was added to neutralize acidic materials and the mixture was poured into rapidly stirred saturated aqueous sodium chloride. The precipitated polymer was collected by suction filtration and washed with water until the washings were neutral and free of chloride. The rate of filtration under suction became progressively slower due to polymer swelling. The isolated lithium salt of the sulfonated polymer was soluble in a 50/50 (volume) mixture of acetone and water and had an inherent viscosity of 3.0 (measured at a concentration of 0.5 weight percent in dimethylacetamide).

Example 19

Employing a prior art procedure, for example, such as disclosed by Bornwater in Recuiel de Traveaux Chemique, Volume 12, pages 105–141 (1912), oxalyl chloride was added in a stoichiometric amount to a mixture of equal amounts of orthonitroaniline and metanitroaniline in tetrahydrofuran containing trimethylamine. The resultant precipitate containing trimethylamine hydrochloride and a high melting mixture of 2,2'-dinitrooxanilide and 3,3'-dinitrooxanilide was separated by filtration. The filtrate was diluted with water to precipitate 2,3'-dinitrooxanilide, melting point 240°–245°C. The 2,3'-dinitro compound was reduced with hydrogen using a palladium-on-charcoal catalyst to obtain 2,3'-diaminooxanilide, melting point 180°–183°C. A polyamide was prepared by condensation of the diamino compound with a 70/30 mixture of isophthaloyl chloride and terephthaloyl chloride. A mixture of 10 grams of the polyamide and 150 grams of a 5 percent solution of sulfur trioxide in dimethylformamide was slowly tumbled in a glass jar at ambient temperature for 3 days. To the reaction mixture were added 3.5 grams of lithium hydroxide and the polymer was isolated as described in Example 3. An asymmetric membrane, prepared and tested as described in Example 4, had a water permeability of 38.2 gallons per sq. ft. per day and a salt passage of 26 percent. A similar membrane made from the unsulfonated polymer had a water permeability of 4.5 gallons per sq. ft. per day and a salt passage of 9.1 percent under the same test conditions.

Example 20

A poly(amide-urea) was prepared by the condensation of 3,3'-diaminocarbanilide with a stoichiometrically equivalent 70/30 mixture of isophthaloyl chloride and terephthaloyl chloride. A mixture of 10 grams of this polymer and 150 grams of a 5 percent solution of sulfur trioxide in dimethylformamide was slowly tumbled at ambient temperature in a glass jar for three days. The resulting reaction mixture was poured into rapidly stirred acetone and the precipitated sulfonated polymer was separated by filtration. The sulfonated polymer was water soluble. Asymmetric membranes were made and tested, as described in Example 4, from the unsulfonated polymer and from a mixture of one part of the sulfonated polymer and three parts of the unsulfonated polymer. The membrane made from the unsulfonated polymer had a water permeability of 2.6 gallons per sq. ft. per day and a salt passage of 22 percent. The membrane made from the mixture of sulfonated and unsulfonated polymers had a water permeability of 21.7 gallons per sq. ft. per day and a salt passage of 8 percent under the same test conditions.

The embodiments of the invention in which an exclusive property or privilege is claimed are defined as follows:

1. Process for sulfonating a polymeric dicarboxamide of a dicarboxylic acid of 2–18 carbon atoms and a metaphenylenediamine which is unsubstituted in at least one of the two phenylene ring positions which are ortho to one amino group and para to the other, which process comprises contacting the polymeric dicarboxamide, an effective amount of a sulfonating agent selected from sulfur trioxide and agents having the formula $ROSO_2X$ wherein R is H or $C_{1-4}$ alkyl and X is hydroxy, amino, $C_{1-4}$ alkoxy or chloro and an N,N-dialkylacylamide at a temperature and for a time until the desired sulfonation is completed.

2. The process of claim 1 wherein the dialkylacylamide has the formula

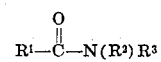

wherein $R^1$ is H or $C_{1-4}$ alkyl, $R^2$ and $R^3$ each is $C_{1-4}$ alkyl, $R^2$ and $R^3$ conjointly is $C_{4-5}$ alkylene, $C_{3-4}$ monooxalkylene or $C_{3-4}$ monoazalkylene, and $R^1$ and either of $R^2$ and $R^3$ conjointly is $C_{3-4}$ alkylene.

3. The process of claim 1 wherein the sulfonating agent is sulfur trioxide and the dialkylacylamide is N,N-dimethylformamide.

4. The process of claim 1 wherein the sulfonating agent is chlorosulfonic acid and the dialkylacylamide is N,N-dimethylformamide.

5. The process of claim 1 wherein the sulfonating agent is sulfuric acid and the dialkylacylamide is N,N-dimethylformamide.

6. The process of claim 1 wherein the sulfonating agent is sulfur trioxide and the dialkylacylamide is N,N-dimethylacetamide.

7. The process of claim 3 which is carried out at 25°–90°C. for 15 minutes to 3 days with a film-forming poly(meta-phenylene phthalamide) as the polymer.

8. The process of claim 7 wherein there is present one molecular proportion of sulfur trioxide and one molecular proportion of dimethylformamide for each gram formula weight of meta-phenylenediamine moiety in the polymer.

* * * * *